(12) United States Patent
Murashita

(10) Patent No.: US 7,404,081 B2
(45) Date of Patent: Jul. 22, 2008

(54) ELECTRONIC STORAGE APPARATUS, AUTHENTICATION APPARATUS AND AUTHENTICATION METHOD

(75) Inventor: Kimitaka Murashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 526 days.

(21) Appl. No.: 11/036,978

(22) Filed: Jan. 19, 2005

(65) Prior Publication Data

US 2005/0144354 A1 Jun. 30, 2005

Related U.S. Application Data

(63) Continuation of application No. PCT/JP02/08836, filed on Aug. 30, 2002.

(51) Int. Cl.
*H04L 9/00* (2006.01)
(52) U.S. Cl. ............... 713/168; 713/182; 713/186; 726/27; 726/28
(58) Field of Classification Search ............ 713/182, 713/184–186, 193, 168; 726/27–28; 382/115–118, 382/124
See application file for complete search history.

(56) References Cited

U.S. PATENT DOCUMENTS

| 6,317,834 B1 * | 11/2001 | Gennaro et al. | ............ 713/186 |
| 6,751,733 B1 * | 6/2004 | Nakamura et al. | .......... 713/182 |
| 7,246,243 B2 * | 7/2007 | Uchida | .................. 713/186 |
| 2002/0077079 A1 | 6/2002 | Ishihara | |

FOREIGN PATENT DOCUMENTS

| JP | 10-207997 | 8/1998 |
| JP | 11-134451 | 5/1999 |
| JP | 3060424 | 6/1999 |
| JP | 2000-123143 | 4/2000 |
| JP | 2000-182025 | 6/2000 |
| JP | 2002-204301 | 7/2002 |
| WO | WO 03/044721 | 5/2003 |

OTHER PUBLICATIONS

European Search Report dated Jun. 12, 2006 for corresponding United Kingdom Patent Application No. GB0603657.8.
The Japanese Patent Office issued an Office Action, Mailed on May 7, 2008, corresponding to Japanese Patent Application No. 2005-534053.

* cited by examiner

*Primary Examiner*—Hosuk Song
(74) *Attorney, Agent, or Firm*—Staas & Halsey LLP

(57) ABSTRACT

An electronic storage apparatus comprises a biometrics information inputting section, a collation section for comparing and collating collation biometrics characteristic information and reference biometrics characteristic information with each other, an authentication result retention section for retaining, where it is recognized that the collation biometrics characteristic information is that of an owner, the result of the authentication, a secret information outputting section capable of outputting secret information of the owner stored in a secret information storage section to the outside, and an authentication result deletion section for deleting, when an unused state detection section detect that the secret information outputting section is in an unused state, the result of authentication retained by the authentication result retention section, whereby the security strength of a card type storage medium is raised and the electronic storage apparatus can be used more easily by a user.

11 Claims, 11 Drawing Sheets

ELECTRONIC STORAGE APPARATUS, AUTHENTICATION APPARATUS AND AUTHENTICATION METHOD

This application is a continuation application, filed under 35 usc 111(a), of International Application PCT/JP02/08836, filed Aug. 30, 2002.

TECHNICAL FIELD

The present invention relates to an electronic storage apparatus, an authentication apparatus and an authentication method suitable for use to authenticate that an object person of authentication is an owner of a card type storage medium.

BACKGROUND ART

In recent years, popularization of IC cards has been and is proceeding in various types of industry and business and various fields regardless of whether they are of the contact type and the contactless type such that, for example, a contact type IC card is used as a credit card or a contactless type IC card is used as a commutation ticket for an electric car. An IC card has an integrated circuit (IC: Integrated Circuit) built therein and is advantageous in that, when compared with a magnetic card of the type which stores information in a magnetic section thereof, the storable data capacity is great, that forgery thereof is difficult, and so forth. Further, a contactless type IC card has a characteristic that contactless communication is possible, and so forth. Thus, IC cards having various functions can be implemented by incorporating circuits for implementing various functions into the IC cards.

It is to be noted that the contactless type IC card is formed by embedding contactless interface antenna in the form of a coil therein, and induced electromotive force is generated by radio waves transmitted from a transmission antenna of an IC card reader to convert the received radio waves into electric energy to drive the IC.

In such a conventional IC card as described above, generally a password authentication method is used to authenticate that a user of the IC card is a legal user. In particular, secret information (for example, an ID (Identification) number, a password and so forth) of an owner stored in an IC memory of an IC card is normally protected against accessing thereto (protect setting). Then, when a user tries to use the IC card, a request to input a password is issued to the user, and, if an inputted password is coincides with the password set in advance, then it is authenticated that the user of the IC card is the owner of the IC card.

Then, only in the case wherein it is authenticated that the user of the IC card is the owner of the IC card in this manner, the IC card is set such that the secret information stored in the IC memory thereof can be read out from the IC card reader (protect cancellation), and the secret information is transmitted in accordance with a request from the IC card reader. It is to be noted that cancellation of protect of an IC card is sometimes called retention of a result of authentication in an IC card.

However, such a conventional password authentication method of an IC card as described above has essential vulnerability in security that a human being itself cannot be identified. In other words, the conventional password authentication method has a subject in that, where so-called "impersonation" is performed using a legal password acquired by means of an illegal procedure such as leakage of a password, analysis of a password or the like, prevention of illegal use of an IC card by an illegal user is difficult.

Therefore, also for an IC card, it is demanded to enhance the authentication strength in the personal identification by introducing biometrics authentication which is a collation technique for identifying a pattern of a fingerprint or the like which is part of the body.

However, since basically the size of a contact type IC card is prescribed by a standard or the like, for example, if a contact type IC card is not formed such that the thickness thereof remains within a predetermined thickness (for example, 0.78 mm), then it cannot be used with an existing IC card reader or IC card reader/writer cannot. The size of a circuit and a device which can be incorporated in such a contact type IC card is limited, and in the present situation, it is difficult to incorporate an intricate function such as a function for fingerprint authentication or the like in an IC card itself.

Further, also regarding an IC card of the contactless type (hereinafter referred to as contactless type IC card), there is the possibility that, if a circuit part for implementing an authentication function is disposed in the proximity of an antenna for a contactless interface, then noise may be generated and obstruct communication with the IC card reader. Also, there is the possibility that, if many chips and so forth are provided in a card, then generation of electromotive force may be obstructed by an influence of the chips and sufficient electromotive force may not be obtained. Therefore, it is impractical to incorporate a circuit for implementing biometrics authentication in such a contactless type IC card as described above.

Further, after authentication of an owner of an IC card is performed by an authentication function, it is necessary to retain a result of the authentication in the IC card at least until communication between the IC card and the IC card reader is started (in other words, it is necessary to keep the IC card in a state wherein secret information can be read out from the IC card using the IC card reader).

However, from the IC card which is in such a state wherein it retains a result of authentication as just described, secret information can be freely read out using the IC card reader. Consequently, for example, if the IC card is lost while it is in the state wherein a result of authentication is retained therein, then there is the possibility that the IC card may be used by a person by whom the IC card is acquired. Therefore, there is a subject that, if a result of authentication of an IC card is retained for a long period time in the IC card, then this increases the vulnerability in security of the IC card.

It is to be noted that, while it is a possible idea to provide an IC card with a timer function so that a result of authentication set in the IC card is deleted after a predetermined period of time elapses, there is a subject that it is difficult to set the preset value for the timer to an optimum value. In particular, if the preset value of the timer is excessively short, then a result of authentication is deleted before communication between the IC card and the IC card reader starts and the IC card cannot be used. On the other hand, if the set value of the timer is excessively long, then the security of the IC card degrades similarly as in the case wherein a timer is not set. In this manner, there is the possibility that it becomes very difficult for the user to use the IC card becomes.

The present invention has been made in view of such subjects as described above, and it is an object of the present invention to provide an electronic storage apparatus, an authentication apparatus and an authentication method which raise the security strength of a card type storage medium and can be used easily by a user.

DISCLOSURE OF THE INVENTION

In order to attain the object described above, according to the present invention, an electronic storage apparatus comprises a secret information storage section for storing secret information regarding an owner, a biometrics information inputting section for inputting biometrics information of an object person of authentication, an extraction section for extracting collation biometrics characteristic information from the biometrics information inputted from the biometrics information inputting section, a collation section for comparing and collating the collation biometrics characteristic information extracted by the extraction section and reference biometrics characteristic information with each other, an authentication result retention section for retaining, where it is recognized from a result of the collation by the collation section that the collation biometrics characteristic information is that of the owner, the result of authentication, a secret information outputting section-capable of outputting the secret information stored in the secret information storage section to the outside, a communication controlling section for causing, where the result of authentication retained by the authentication result retention section indicates that the collation biometrics characteristic information is that of the owner, the secret information outputting section to output the secret information stored in the secret information storage section, an unused state detection section capable of detecting that the secret information outputting section is in an unused state, and an authentication result deletion section for deleting, when the unused state detection section detect that the secret information outputting section is in an unused state, the result of authentication retained by the authentication result retention section.

The secret information outputting section may include a contact type terminal and can output the secret information to the outside of the electronic storage apparatus through the contact type terminal. Or, the secret information outputting section may include a non-contact type communication function and can output the secret information to the outside of the electronic storage apparatus by means of the non-contact type communication function.

The electronic storage apparatus may be configured such that at least the secret information outputting section is provided on a card section having a shape of a card, and at least the biometrics information inputting section is provided in a main body section connected for communication to the card section. Further, the electronic storage apparatus may be configured such that one end portion of the card section and the main body section are connected to each other by a hinge such that the card section can be attached for folding with respect to the main body section, and the unused state detection section detects that the card section is in an unused state by detecting a state wherein the card section is folded.

Or, the electronic storage apparatus may be configured such that the card section is removably attached to the main body section, and the unused state detection section detects that the card section is in an unused state by detecting that, after it is detected by the collation section that the collation biometrics characteristic information is that of the owner, the card section is removed from the main body section once and then attached to the main body section again. Further, the card section may be configured for insertion into the main body section.

Further, according to the present invention, an authentication apparatus, on which a card type storage medium including a secret information storage section for storing secret information of an owner, an output permission retention section capable of retaining an output permission for permitting outputting of the secret information, a secret information outputting section capable of outputting the secret information stored in the secret information storage section to the outside, and a communication controlling section for causing, where the output permission is retained in the output permission retention section, the secret information outputting section to output the secret information stored in the secret information storage section can be mounted, for authenticating that an object person of authentication is the owner of the card type storage medium, comprises a card type storage medium attaching section capable of removably attaching the card type storage medium thereto, a biometrics information inputting section for inputting biometrics information of the object person of authentication, an extraction section for extracting collation biometrics characteristic information from the biometrics information inputted through the biometrics information inputting section, a collation section for comparing and collating the collation biometrics characteristic information extracted by the extraction section and reference biometrics characteristic information, an output permission setting section for causing, where it is recognized from a result of the collation by the collation section that the collation biometrics characteristic information is that of the owner, the output permission retention section of the card type storage medium to retain the output permission, an unused state detection section capable of detecting that the card type storage medium is in an unused state, and an authentication result deletion section for deleting, when the unused state detection section detects that the card type storage medium is in an unused state, the output permission retained by the output permission retention section.

The unused state detection section may detect that the card type storage medium is in an unused state by detecting that, after it is recognized by the collation section that the collation biometrics characteristic information is that of the owner, the card type storage medium is removed from the card type storage medium attaching section once and then attached to the card type storage medium attaching section again. The card type storage medium may be configured for insertion into the card type storage medium attaching section.

Further, according to the present invention, an authentication method for authenticating that an object person of authentication is an owner of a card type storage medium in which secret information is stored comprises a biometrics information inputting step of inputting biometrics information of the object person of authentication, an extraction step of extracting collation biometrics characteristic information from the biometrics information inputted at the biometrics information inputting step, a collation step of comparing and collating the collation biometrics characteristic information extracted at the extraction step and reference biometrics characteristic information, an authentication result retention step of retaining, where it is recognized from a result of the collation at the collation step that the collation biometrics characteristic information is that of the owner, the result of the authentication, a secret information outputting step capable of outputting, where the result of the authentication retained at the authentication result retention step indicates that the collation biometrics characteristic information is that of the owner, the secret information to the outside, an unused state detection step capable of detecting that the card type storage medium is in an unused state, and an authentication result deletion step of deleting, where it is detected at the unused state detection step that the card type storage medium is in an unused state, the result of the authentication retained at the authentication result retention step.

According to the electronic storage apparatus, authentication apparatus and authentication method of the present invention, the following effects or advantages can be anticipated.

(1) Since collation biometrics characteristic information extracted from inputted biometrics information of an object person of authentication and reference biometrics characteristic information are compared and collated with each other and, if it is recognized that the collation biometrics characteristic information is that of an owner, then the result of the authentication is retained and secret information is outputted to the outside, the secret information is outputted only when it is recognized that the collation biometrics characteristic information is that of the owner. Consequently, the authentication strength in personal identification can be enhanced and "impersonation" by any other than the owner can be prevented, and illegal use of the IC card by a person having no fair authority can be prevented to raise the security strength.

(2) When it is detected that a card type storage medium is in an unused state, the retained authentication result is deleted. Consequently, even if the electronic storage apparatus is lost or in a like case, any third party who acquires the electronic storage apparatus cannot use the electronic storage apparatus at all. Also this can enhance the security.

(3) Where secrete information is outputted to the outside of the electronic storage apparatus through the contact type terminal, the secret information can be outputted with certainty.

(4) Where secrete information is outputted to the outside of the electronic storage apparatus by the contactless type communication function, the secret information can be communicated readily with the outside.

(5) Where at least the secret information outputting section is provided on the card section having a card shape and at least the biometrics information inputting section is provided on the main body section connected for communication with the card section, it is possible to use the main body section to input biometrics information and use the card section to communicate with the outside. Consequently, the availability is high.

(6) Where the one end portion of the card section and the main body section are connected to each other by the hinge such that the card section can be attached for folding with respect to the main body section and it is detected that the card section is in an unused state by detecting a state wherein the card section is folded, the unused state of the card section can be recognized readily and with certainty with a simple configuration.

(7) Also where the card section is removably attached to the main body section and it is detected that, after it is recognized that the collation biometrics characteristic information is that of the owner, the card section is removed from the main body section once and then attached to the main body section again, the unused state of the card section can be recognized readily and with certainty with a simple configuration.

(8) Where the card section is configured for insertion into the main body section, the present apparatus can be configured simply.

BEST MODE FOR CARRYING OUT THE INVENTION

In the following, embodiments of the present invention are described with reference to the drawings.

(A) Description of the First Embobiment

Figure 1:
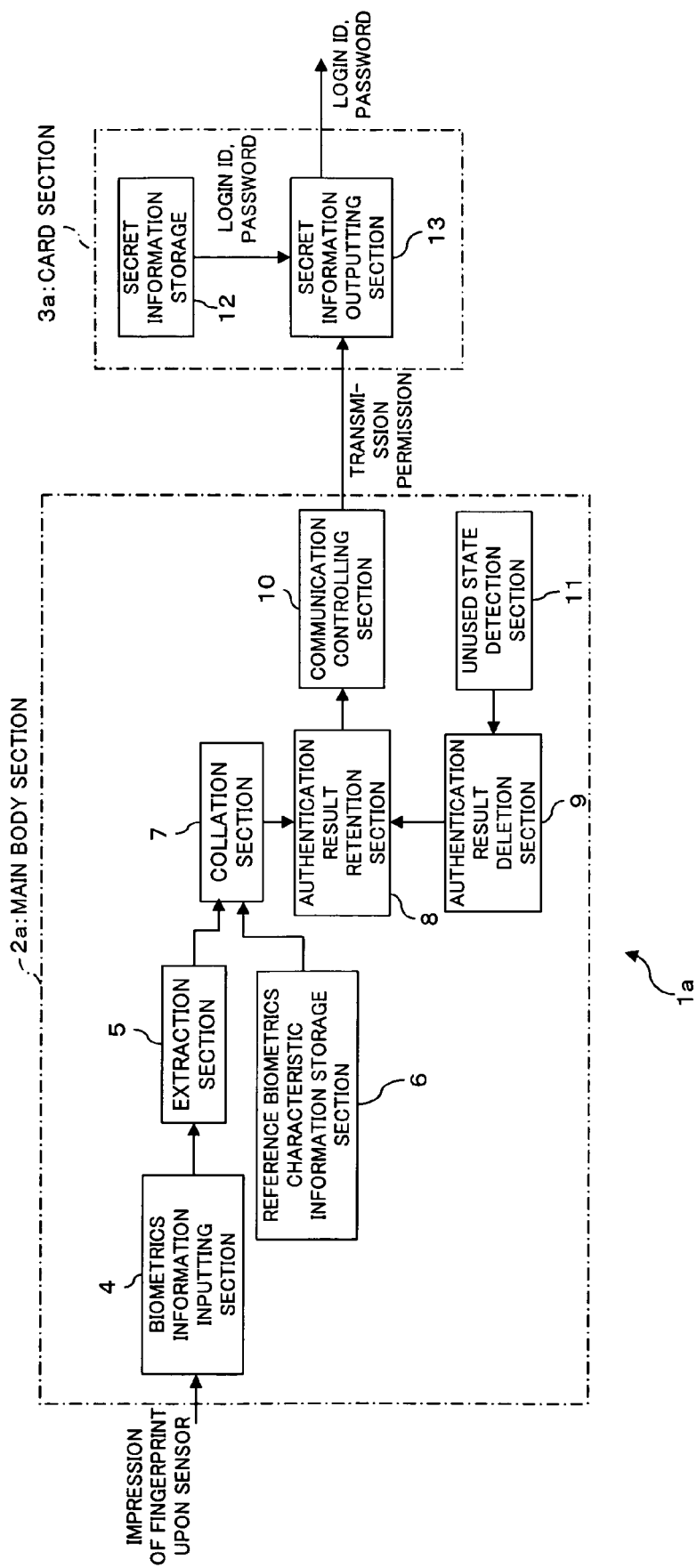
FIG. 1 is a block diagram showing a functional configuration of an IC card apparatus (electronic storage apparatus) with an authentication function as a first embodiment of the present invention.
Figure 2:
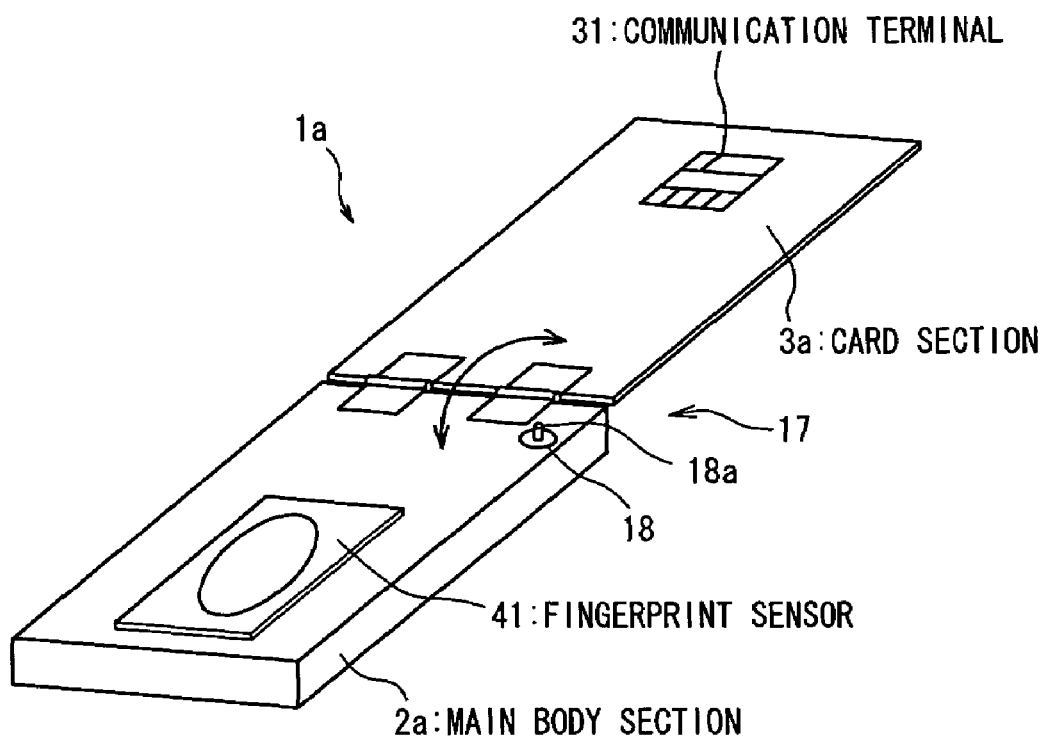
FIG. 2 is a perspective view schematically showing an appearance of the IC card apparatus with an authentication function as the first embodiment of the present invention.
Figure 3:
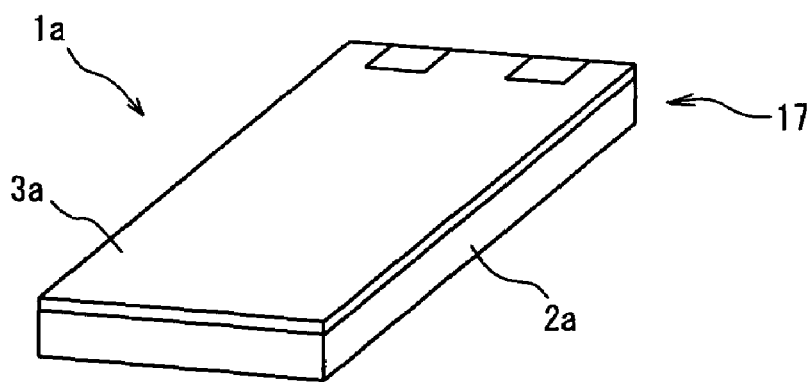
FIG. 3 is a perspective view schematically showing an appearance of the IC card apparatus with an authentication function as the first embodiment of the present invention.

FIG. 1 is a block diagram showing a functional configuration of an IC card apparatus (electronic storage apparatus) with an authentication function as a first embodiment of the present invention, and FIGS. 2 and 3 are perspective views schematically showing an appearance of the IC card apparatus. It is to be noted that FIG. 2 shows the present IC card apparatus 1a with an authentication function in an opened (used) state, and FIG. 3 shows the IC card apparatus 1a in a closed (unused) state.

The IC card apparatus 1a with an authentication function of the first embodiment is an IC card (card type storage medium) having an authentication function for authenticating, using biometrics information of an object person of authentication, that the object person of authentication is an owner of the IC card apparatus 1a with an authentication function. Further, if it is authenticated that the object person of authentication is an owner of the IC card apparatus 1a with an authentication function, then the IC card apparatus 1a can output secret information (login ID (Identification) and password) stored in a secret information storage section 12 (hereinafter described) using an IC card reader (not shown).

As shown in FIG. 1, the IC card apparatus 1a with an authentication function includes a biometrics information inputting section 4, an extraction section 5, a reference biometrics characteristic information storage section 6, a collation section 7, an authentication result retention section 8, an authentication result deletion section 9, a communication controlling section 10, an unused state detection section 11, a secret information storage section 12, and a secret information outputting section 13.

Further, in the present embodiment, the biometrics information inputting section 4, extraction section 5, reference biometrics characteristic information storage section 6, collation section 7, authentication result retention section 8, authentication result deletion section 9, communication controlling section 10 and unused state detection section 11 are provided on a main body section 2a, and the secret information storage section 12 and secret information outputting section 13 are provided on a card section 3a. The main body section 2a and the card section 3a are connected for opening and closing motion to each other through a hinge 17 (refer to FIGS. 2 and 3; details are hereinafter described).

It is to be noted that the components provided on the main body section 2a and the components provided on the card section 3a are connected to each other, for example, through FPC (Flexible Printed Circuits) wires.

The card section 3a has a shape (card shape) same as or substantially same as that of a conventional IC card. The card section 3a includes a communication function similarly as in a conventional IC card. Therefore, the card section 3a can output secret information stored in the secret information storage section 12 through the secret information outputting section 13 using an existing IC card reader or IC card reader/writer, and can write secret information into a memory not shown or the like using an IC card reader/writer. In particular, the size and the communication standard (protocol) of the card of the card section 3a comply with a standard regarding existing IC cards.

The secret information storage section 12 has secret information (personal identification code) stored in advance therein regarding an owner of the IC card apparatus 1a with an authentication function. The personal identification code stored as secret information includes, for example, ID (Identification) information such as a login ID, a password, a personal identification number, a secret key and so forth.

The secret information outputting section 13 outputs the secret information stored in the secret information storage section 12 to the outside, and is formed, for example, as a terminal (contact type terminal) for communicating with an IC reader (not shown) or as a coil antenna (contactless type communication function). As shown in FIG. 2, in the IC card apparatus 1a with an authentication function, a communication terminal 31 formed as a contact type terminal is used as the secret information outputting section 13.

The biometrics information inputting section 4 inputs (samples) biometrics information (organism information) of an object person of authentication (user). In the present embodiment, the biometrics information inputting section 4 is implemented by a fingerprint inputting apparatus (fingerprint sensor 41; refer to FIG. 2) for sampling, as image data, a fingerprint as biometrics information.

The extraction section 5 extracts collation biometrics characteristic information from the biometrics information inputted from the biometrics information inputting section 4. The collation biometrics characteristic information storage section 6 stores (preserves) the reference biometrics characteristic information regarding an owner of the IC card apparatus 1a with an authentication function in advance.

The collation section 7 compares and collates the collation biometrics characteristic information extracted by the extraction section 5 and the reference biometrics characteristic information stored in the reference biometrics characteristic information storage section 6 with each other.

The authentication result retention section 8 retains, if it is recognized from a result of the collation by the collation section 7 that the collation biometrics characteristic information is that of the owner, a result of the authentication. More particularly, the authentication result retention section 8 sets a flag indicating that the collation biometrics characteristic information is that of the owner.

The authentication result deletion section 9 deletes, when the unused state detection section 11 detects that the secret information outputting section 13 is in an unused state, the result of the authentication retained in the authentication result retention section 8. More particularly, the authentication result deletion section 9 resets the flag set in the authentication result retention section 8.

The communication controlling section 10 causes, if the result of the authentication retained by the authentication result retention section 8 indicates that the collation biometrics characteristic information is that of the owner, the secret information outputting section 13 to output the secret information stored in the secret information storage section 12. More particularly, the communication controlling section 10 causes, if the flag indicating that the collation biometrics characteristic information is that of the owner is set in the authentication result retention section 8, the secret information outputting section 13 to output the personal identification code stored in the secret information storage section 12.

In the IC card apparatus 1a with an authentication function, if it is authenticated from the result of the collation between the collation biometrics characteristic information and the reference biometrics characteristic information by the collation section 7 that the collation biometrics characteristic information extracted by the extraction section 5 is that of the owner, then the flag indicating the result of the authentication is set in the authentication result retention section 8. Then, the communication controlling section 10 issues (controls) transmission permission to the secret information outputting section 13 so as to output the personal identification code (secret information) stored in the secret information storage section 12.

The unused state detection section 11 detects that the secret information outputting section 13 (card section 3a) is in an unused state. In the first embodiment, the unused state detection section 11 detects that the card section 3a and the main body section 2a are closed to detect that the secret information outputting section 13 (card section 3a) is placed into an unused state.

In the first embodiment, that the card section 3a and the main body section 2a are closed is detected by a folding detection section 18 (refer to FIG. 2) hereinafter described thereby to detect that the secret information outputting section 13 (card section 3a) is placed into an unused state. It is to be noted that the unused state detection section 11 is not limited to this, but the unused state detection section 11 may detect that a lock mechanism 15 (refer to FIG. 5) hereinafter described is unlocked thereby to detect that the card section 3a and the main body section 2 are closed, and variations and modifications can be made without departing from the scope of the present invention.

The authentication result deletion section 9 deletes, when the unused state detection section 11 detects that the secret information outputting section 13 (card section 3a) is in an unused state, the result of authentication retained in the authentication result retention section 8. In particular, the authentication result deletion section 9 deletes (resets) the flag retained in the authentication result retention section 8 and indicating that collation biometrics characteristic information is that of the owner.

Then, in the IC card apparatus 1a with an authentication function, since the flag set in the authentication result retention section 8 is deleted in such a manner as described, the secret information outputting section 13 cannot output the personal identification code (secret information) stored in the secret information storage section 12.

It is to be noted that, in the IC card apparatus 1a with an authentication function, for example, a CPU (Central Processing Unit), a ROM (Read Only Memory), a RAM (Random Access Memory) and so forth are connected to each other by a bus line. In this instance, the functions as the biometrics information inputting section 4, extraction section 5, collation section 7, authentication result deletion section 9, communication controlling section 10 and unused state detection section 11 can be implemented by the CPU, and the functions as the reference biometrics characteristic information storage section 6, authentication result retention section 8 and secret information storage section 12 can be implemented by the ROM and/or the RAM. Further, the function as the secret information outputting section 13 can be implemented by a communication terminal 31 hereinafter described or a communication antenna.

Figure 4:
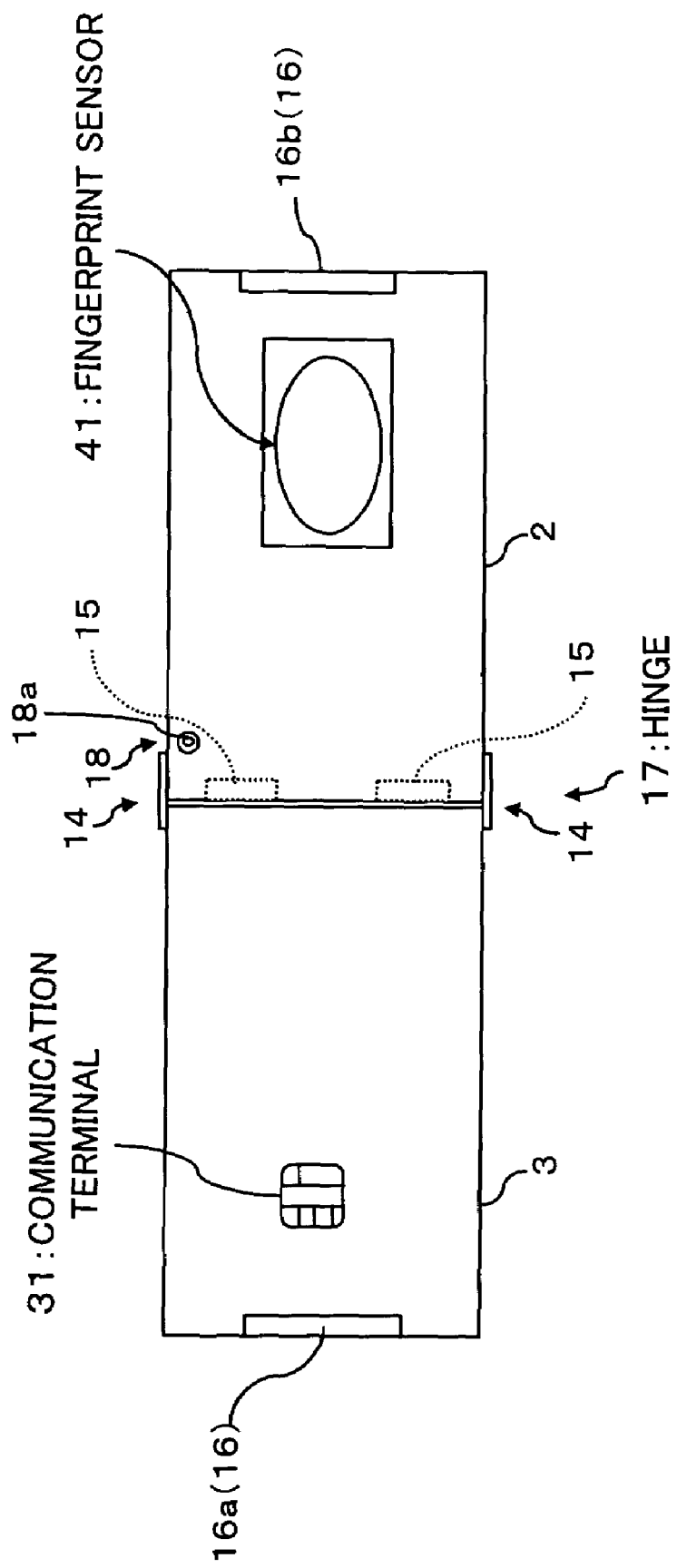
FIG. 4 is a top plan view showing the IC card apparatus with an authentication function as the first embodiment of the present invention in a developed state as viewed from a face of the side on which a fingerprint sensor is mounted.
Figure 5:
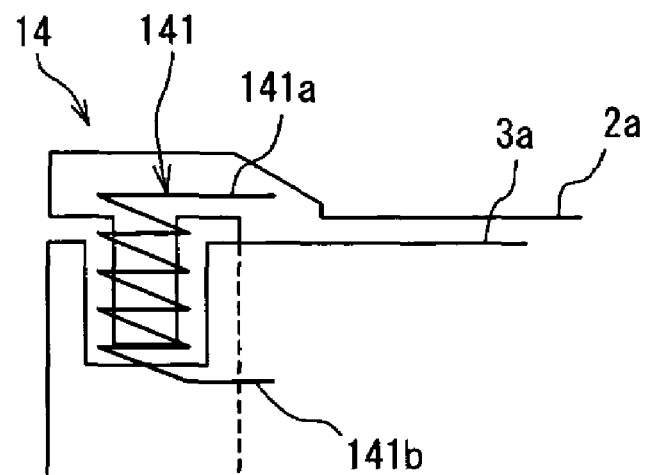
FIG. 5 is a view schematically showing a configuration of a spring mechanism in the IC card apparatus with an authentication function as the first embodiment of the present invention.
Figure 6:
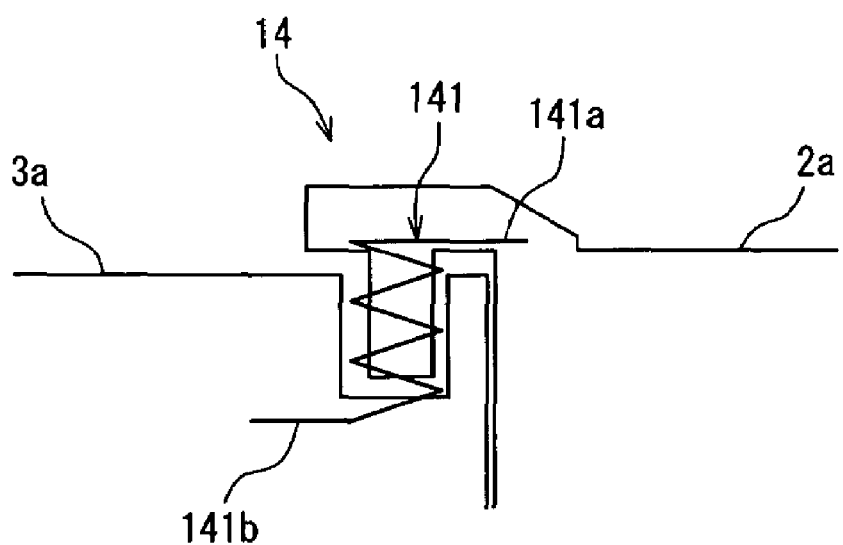
FIG. 6 is a schematic view showing a configuration of a spring mechanism in the IC card apparatus with an authentication function as the first embodiment of the present invention.

Now, a structure of the IC card apparatus 1a with an authentication function as the first embodiment of the present invention is described with reference to FIGS. 2 to 9. FIG. 4 is atop planview showing the IC card apparatus with an authentication function as the first embodiment of the present invention in a developed state as viewed from a face of the side on which the fingerprint sensor 41 is mounted. FIGS. 5 and 6 are schematic views showing a configuration of a spring mechanism of the finger print sensor 41. It is to be noted that FIG. 5 shows the card section 3a and the main body section 2 in a closed state, and FIG. 6 shows the card section 3a and the main body section 2 in an open state.

As shown in FIGS. 2 and 3, the IC card apparatus la with an authentication function includes the main body section 2a including the fingerprint sensor 41 and the card section 3a including the communication terminal 31. The main body section 2a and the card section 3a are connected for opening and closing motion through the hinge 17 in such a manner as described above. In particular, an edge of a face of the card section 3a on which the communication terminal 31 is formed is connected for pivotal motion through the hinge 17 to an edge of a face of the main body section 2a on which the fingerprint sensor 41 is formed. Thus, by closing the hinge 17, the face of the main body section 2a on which the fingerprint sensor 41 is formed and the face of the card section 3a on which the communication terminal 31 is formed can be placed one on the other to cover each other (refer to FIG. 3), and by opening the hinge 17, the card section 3a and the main body section 2a can be developed so as to form a substantially same plane (refer to FIG. 2).

Then, when the owner tries to use the fingerprint sensor 41 of the main body section 2a, the hinge 17 is developed so that the face on which the fingerprint sensor 41 is formed appears and the IC card apparatus 1a is placed into a usable state as shown in FIG. 2.

Further, as shown in FIG. 4, spring mechanisms 14 are individually provided at the opposite ends of the hinge 17. Each of the spring mechanisms 14 includes a helical torsion coil spring 141. An arm 141a of the helical torsion coil spring 141 is embedded in the main body section 2a, and the other arm 141b of the helical torsion coil spring 141 is embedded in the card section 3a. Thus, the helical torsion coil spring 141 exerts a moment to the card section 3a to close the card section 3a and the main body section 2a.

In particular, when the card section 3a is in a closed state with respect to the main body section 2a as shown in FIG. 5, torsional load is not applied to the helical torsion coil spring 141. On the other hand, when the card section 3a is in an open state with respect to the main body section 2a as shown in FIG. 6, torsional load is applied to the helical torsion coil spring 141. Consequently, when the card section 3a is in an open state, the helical torsion coil spring 141 exerts a moment to close the card section 3a.

Further, the IC card apparatus 1a with an authentication function includes a lock mechanism 15 for locking the card section 3a and the main body section 2a in a developed state so that, in a state wherein the card section 3a and the main body section 2a are in an open state, the card section 3a and the main body section 2a may not be closed.

Figure 7:
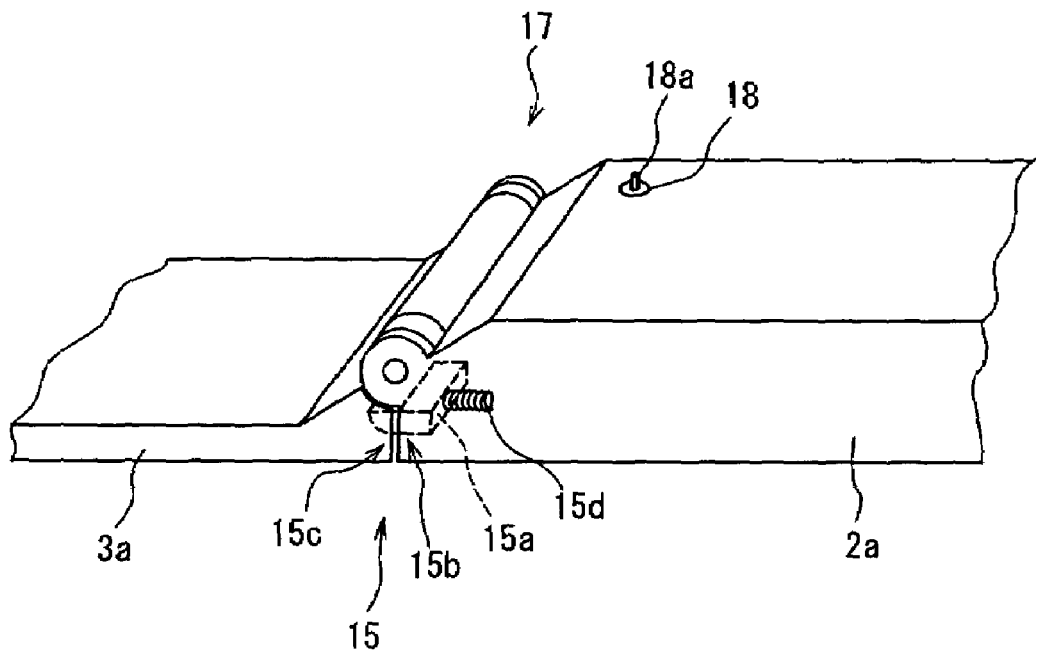
FIG. 7 is a perspective view schematically showing a configuration of hinge and lock mechanisms of the IC card apparatus with an authentication function as the first embodiment of the present invention.
Figure 8:
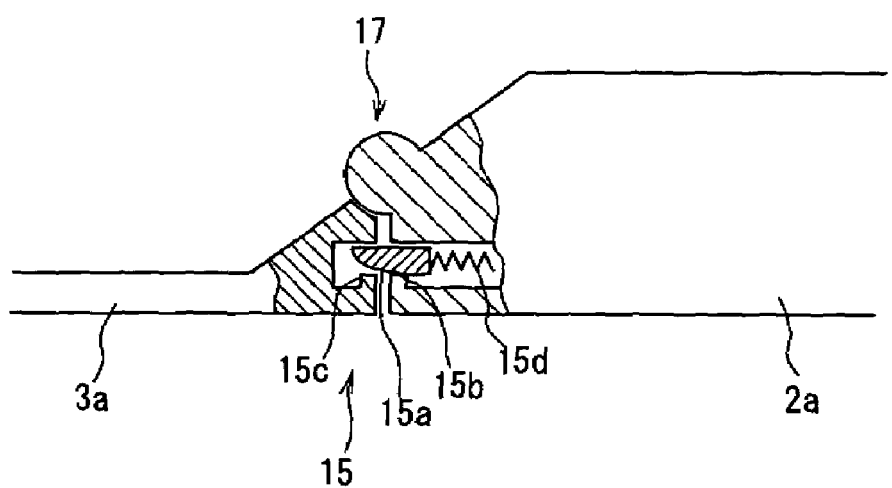
FIG. 8 is a side sectional view, partly broken, showing the hinge and lock mechanisms of the IC card apparatus with an authentication function as the first embodiment of the present invention.
Figure 9:
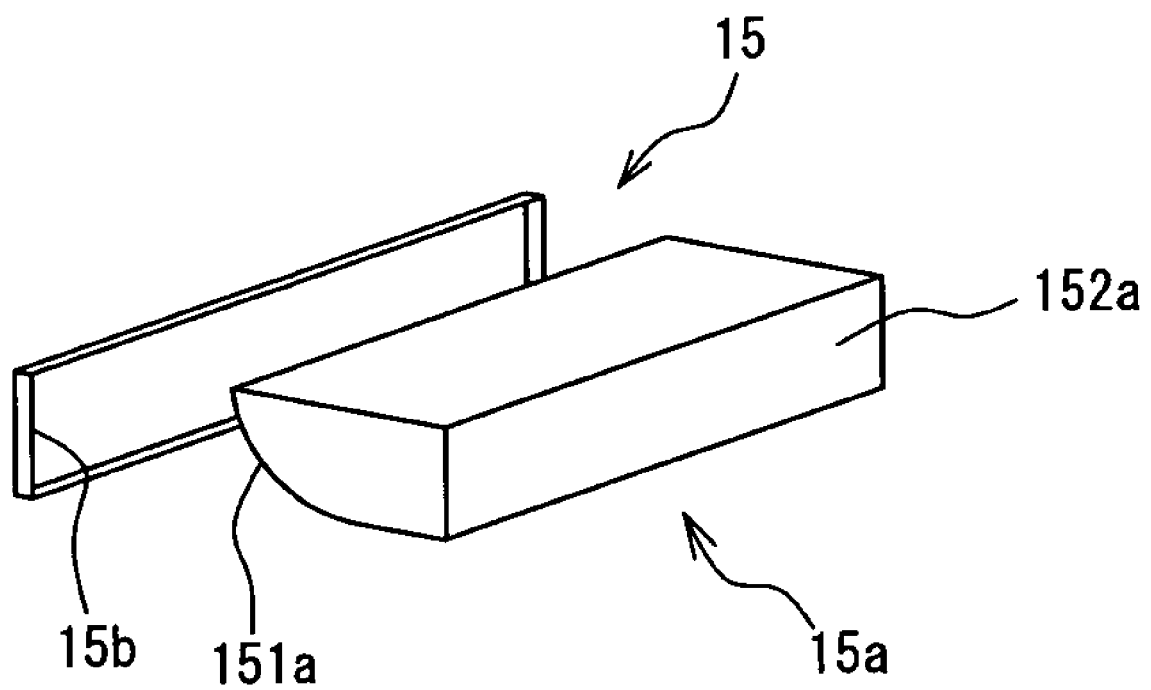
FIG. 9 is a perspective view showing the lock mechanism of the IC card apparatus with an authentication function as the first embodiment of the present invention.

FIG. 7 is a perspective view schematically showing a configuration of the hinge 17 and the lock mechanism 15 of the IC card apparatus 1a with an authentication function as the first embodiment of the present invention. FIG. 8 is a side elevational sectional view, partly broken, showing the hinge 17 and the lock mechanism 15. FIG. 9 is a perspective view showing the lock mechanism 15.

As shown in FIGS. 7 to 9, the lock mechanism 15 includes a lock claw 15a, lock holes 15b and 15c, and a spring 15d. As shown in FIG. 8, the lock claw 15a is formed as a triangle pole having a sectional shape of a right triangle formed such that the hypotenuse thereof draws an outwardly swollen arc. The lock claw 15a is disposed such that the face (arc face) 151a thereof formed in an arcuate shape is directed to the opposite side to the face of the main body section 2a on which the fingerprint sensor 41 is formed and an edge defined by one of the vertices of the right triangle opposes to the lock hole 15b.

Further, as shown in FIGS. 7 and 8, the spring 15d is disposed on a face 152a of the lock claw 15a on the side remote from the lock hole 15b so as to press the lock claw 15a toward the lock hole 15b.

The lock hole 15b is a hole for engaging with the lock claw 15a in a state wherein the card section 3a and the main body section 2a are developed, and is formed so as to open on a wall face (face on the side with which an end face of the card section 3a contacts when the card section 3a and the main body section 2a are developed) of the main body section 2a. The length of the lock hole 15b in a widthwise direction (depthwise direction in FIGS. 7 and 8) is somewhat longer than that of the lock claw 15a in the same direction, and the length of the lock hole 15b in a heightwise direction (upward and downward direction in FIGS. 7 and 8) is somewhat shorter than that of the lock claw 15a in the same direction. Thus, the lock claw 15a pressed by the spring 15d is contacted with the lock hole 15b halfway of the arc face 151a.

Consequently, when the lock claw 15a is pressed against the lock hole 15b by the spring 15d, the lock claw 15a is fitted into the lock hole 15b halfway of the arc face 151a of the lock claw 15*a* and only an end portion of the lock claw 15*a* projects from the lock hole 15*b*. Therefore, the lock claw 15*a* does not completely come out from the lock hole 15*b*.

Similarly to the lock hole 15*b*, also the lock hole 15*c* is a hole for engaging with the lock claw 15*a* in a state wherein the card section 3*a* and the main body section 2*a* are developed, and is formed so as to open on the wall face (face on the side with which the end face of the main body section 2*a* contacts when the card section 3*a* and the main body section 2*a* are developed) of the card section 3*a*. Also the length of the lock hole 15*c* in a widthwise direction (depthwise direction in FIGS. 7 and 8) is somewhat longer than that of the lock claw 15*a* in the same direction, and the length of the lock hole 15*c* in a heightwise direction (upward and downward direction in FIGS. 7 and 8) is somewhat shorter than that of the lock claw 15*a* in the same direction. Thus, the lock claw 15*a* pressed by the spring 15*d* is contacted against the lock hole 15*c* halfway of the arc face 151*a*.

Consequently, when the lock claw 15*a* is pressed against the lock hole 15*b* by the spring 15*d*, the lock claw 15*a* is fitted into the lock hole 15*c* halfway of the arc face 151*a* and only an end portion of the lock claw 15*a* projects into the card section 3*a* from the lock hole 15*c*. Therefore, the lock claw 15*a* does not completely come out from the lock hole 15*c*.

Then, if the card section 3*a* and the main body section 2*a* are developed, then the lock claw 15*a* is pressed into the lock holes 15*b* and 15*c* by the spring 15*d* as shown in FIG. 8. Consequently, the lock claw 15*a* is engaged with the lock holes 15*b* and 15*c*, and the card section 3*a* and the main body section 2*a* are fixed in the developed state (refer to FIG. 8).

Further, in the state wherein the card section 3*a* and the main body section 2*a* are developed, the lock claw 15*a* is pressed toward the lock holes 15*b* and 15*c* by the spring 15*d*. However, if a predetermined load or more is applied in a direction for folding the card section 3*a* and the main body section 2*a* toward each other, then the face of the lock hole 15*c* with which the arc face 151*a* of the lock claw 15*a* contacts presses the lock claw 15*a*, and as a result, the lock claw 15*a* is moved in a direction for compressing the spring 15*d* to disengage the lock claw 15*a* from the lock hole 15*c*.

It is to be noted that the force necessary to fold up the card section 3*a* and the main body section 2*a* which are locked by the lock mechanism 15 can be adjusted by variously modifying several coefficients (for example, a spring constant, a size and so forth) of the spring 15*d*, a curvature of the arc face 151*a* of the lock claw 15*a* and so forth. Further, a mechanism may be provided which moves the lock claw 15*a* back into the inside of the main body section 2*a* against the spring 15*d* in a state wherein the card section 3*a* and the main body section 2*a* are folded.

Further, the IC card apparatus 1*a* with an authentication function includes a holding mechanism 16 for holding, in a state wherein the card section 3*a* and the main body section 2*a* are closed, the card section 3*a* and the main body section 2*a* so as not to separate from each other. In the present embodiment, as shown in FIG. 4, the holding mechanism 16 is formed from a pair of permanent magnets 16*a* and 16*b* placed at positions at which, in a state wherein the card section 3*a* and the main body section 2*a* are closed, they overlap with each other. It is to be noted that the holding mechanism 16 is not limited to such a pair of the permanent magnets 16*a* and 16*b* as just described but can be carried out in various modified forms.

The folding detection section 18 detects a state wherein the card section 3*a* and the main body section 2*a* are opened or closed, and includes a projection 18*a* formed on a face of the main body section 2*a* on which the fingerprint sensor 41 is formed or a face of the card section 3*a* on which the communication terminal 31 is formed, so as to project for back and forth movement from the face, and a sensor section (not shown) for detecting that the projection 18*a* is pressed down or projected.

The projection 18*a* is biased by a spring not shown so that it projects from the face of the main body section 2*a* on which the fingerprint sensor 41 is formed, and is pressed down, when the card section 3*a* and the main body section 2*a* are closed, by a face of the card section 3*a* on which the communication terminal 31 is formed. Then, the sensor section detects that the projection 18*a* is pressed down (or the projection 18*a* is released from the card section 3*a* and projected) and issues a notification of this to the CPU.

Further, in the IC card apparatus 1*a* with an authentication function, a power supply is connected to the IC card apparatus 1*a* with an authentication function in response to development of the card section 3*a* and the main body section 2*a*, that is, in response to projection of the projection 18*a* of the folding detection section 18, and as a result, power is supplied to the fingerprint sensor 41, the CPU not shown and so forth. Further, the power supply to the IC card apparatus 1*a* with an authentication function is cut off in response to closing of the card section 3*a* and the main body section 2*a*, that is, in response to pressing down of the projection 18*a* of the folding detection section 18, and as a result, the supply of power to the fingerprint sensor 41, the CPU now shown and so forth is cut off.

It is to be noted that the authentication result deletion section 9 described above deletes a result of authentication retained in the authentication result retention section 8 before supply of power to the CPU and so forth is cut off.

Further, the IC card apparatus 1*a* with an authentication function includes a notification section for issuing, if it is authenticated by the collation section 7 that an object person of authentication is an owner of the IC card apparatus 1*a* with an authentication function, a notification of the result of the authentication to the user. The notification section is implemented, for example, by an LED, a liquid crystal monitor or the like, and issues a notification to the user that the authentication results in success. It is to be noted that the notification method of the notification section is not limited to the notification to the user which depends upon a visual sense such as an LED, a liquid crystal monitor or the like. For example, a notification may be issued to the user by a technique which uses, for example, another sense such as a hearing sense to sound (voice), a touch sense and so forth, and variations and modifications can be made without departing from the scope of the present invention.

Figure 10:
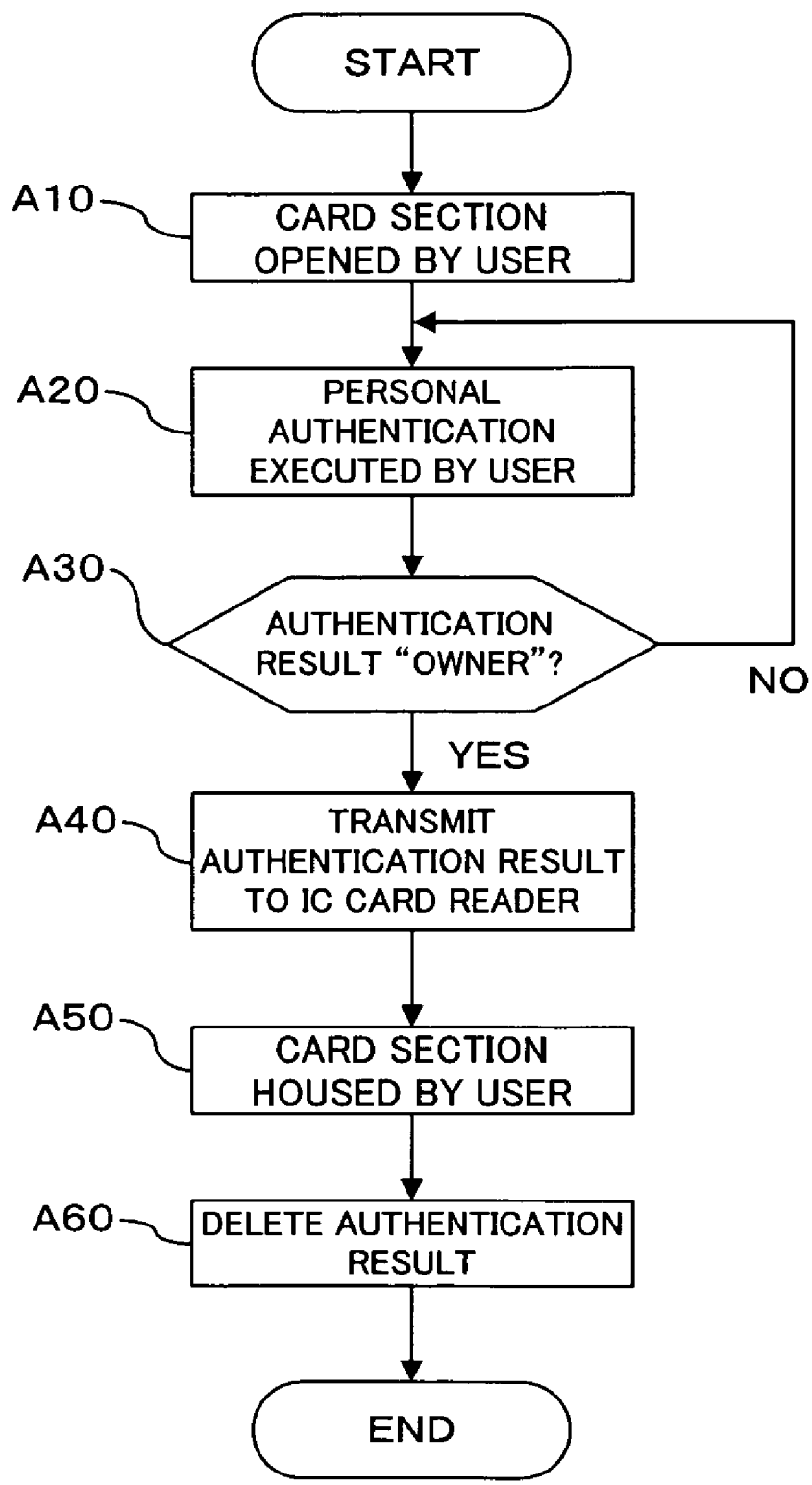
FIG. 10 is a flow chart illustrating an authentication process of a user (object person of authentication) by the IC card apparatus with an authentication function as the first embodiment of the present invention.

An authentication process of a user (object person of authentication) by the IC card apparatus 1*a* with an authentication function according to the first embodiment of the present invention configured as described above is described with reference to a flow chart (steps A10 to A60) shown in FIG. 10.

If the user opens the card section 3*a* of the IC card apparatus 1*a* with an authentication function (step A10), then power is supplied to the fingerprint sensor 41, the CPU and so forth provided in the main body section 2*a*, and as a result, the IC card apparatus 1*a* with an authentication function is rendered possible to perform authentication of a fingerprint.

If the user touches at a finger thereof with the fingerprint sensor 41, then the fingerprint sensor (biometrics information inputting section 4) 41 reads the fingerprint of the user (biometrics information inputting step), and the CPU (extraction section 5) extracts collation biometrics characteristic information such as characteristic points based on image data of the read fingerprint (extraction step). Then, the CPU (collation section 7) compares and collates the extracted collation biometrics characteristic information and the reference biometrics characteristic information stored in the RAM with each other (reference biometrics characteristic information storage section 6) (step A20; collation step) to decide whether or not the collation biometrics characteristic information is that of an owner (personal authentication) (step A30).

Where it is authenticated as a result of the personal authentication that the inputted fingerprint is that of the owner of the IC card apparatus 1a with an authentication function (refer to YES route at step A30), the flag indicating that the inputted fingerprint is that of the owner of the IC card apparatus 1a with an authentication function is set in the RAM (authentication result retention section 8) (authentication result retention step). Further, a notification that the user is authenticated is issued to the user.

Then, the user would insert the card section 3a of the IC card apparatus 1a with an authentication function into the IC card reader. Thus, the CPU (communication controlling section 10) outputs the personal identification code stored in the RAM (secret information storage section 12) in response to a request from the IC card reader (step A40; secret information outputting step).

On the other hand, if it is authenticated as a result of the personal authentication that the inputted fingerprint is not that of the owner of the IC card apparatus 1a with an authentication function (refer to NO route at step A30), then an error notification or the like is issued to the user and the processing returns to step A20.

The user would fold and store the card section 3a after the IC card apparatus 1a with an authentication function is housed (step A50). The CPU (unused state detection section 11) detects that the card section 3a is folded thereby to detect that the card section 3a (communication terminal 31) is placed into an unused state (unused state detection step), and the CPU (authentication result deletion section 9) deletes the flag of the result of the authentication retained in the RAM (step A60; authentication result deletion step). Thereafter, the power supply to the IC card apparatus 1a with an authentication function is cut off.

In the IC card apparatus 1a with an authentication function, since the flag of the result of the authentication retained by the authentication result retention section 8 is not deleted until it is detected by the unused state detection section 11 that the card section 3a is folded, a plurality of processes can be performed in response to a request from the IC card reader within a period after the execution of the fingerprint authentication till the folding of the card section 3a.

Figure 11:
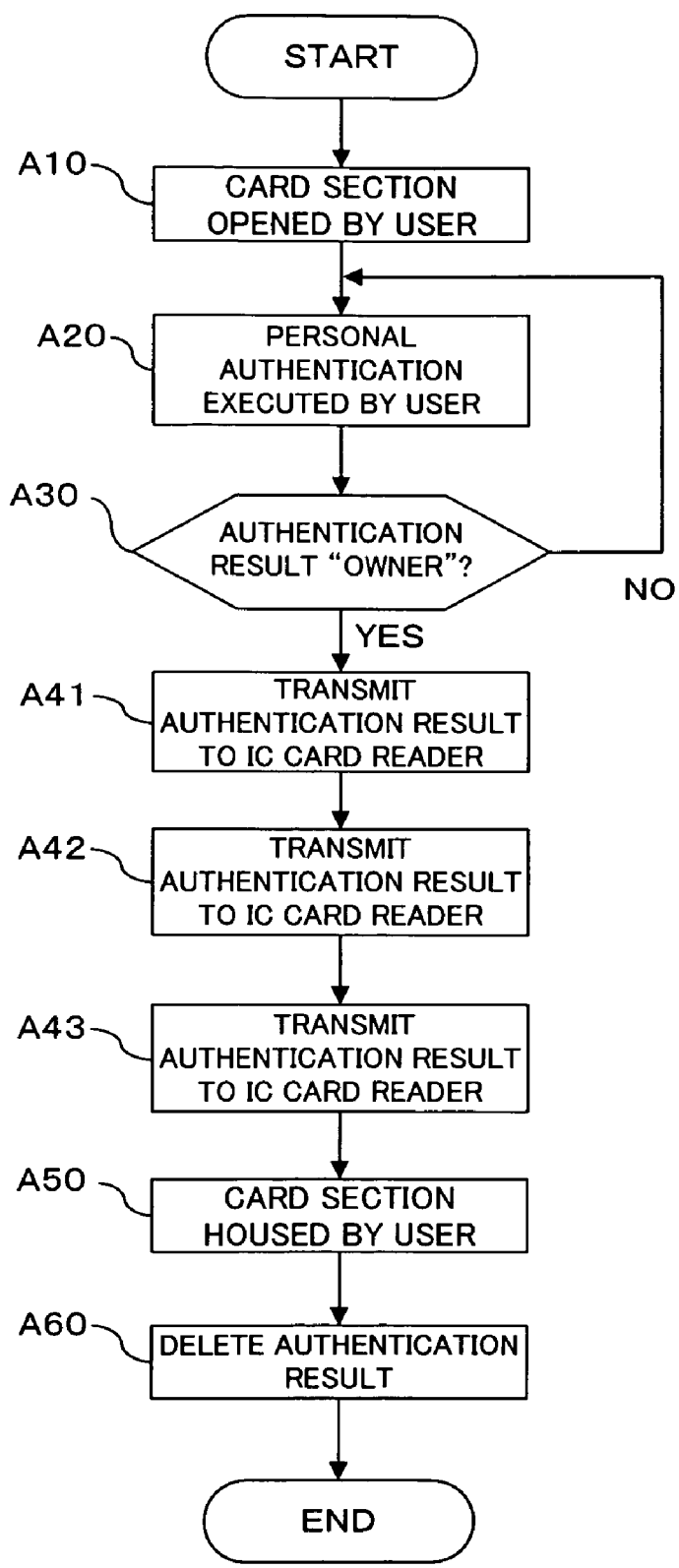
FIG. 11 is a flow chart illustrating another authentication process of a user (object person of authentication) by the IC card apparatus with an authentication function as the first embodiment of the present invention.

FIG. 11 is a flowchart (steps A10 to A60) illustrating another authentication process of a user (object person of authentication) by the IC card apparatus 1a with an authentication function according to the first embodiment of the present invention. It is to be noted that the flow chart shown in FIG. 11 includes steps A41, A42 and A43 in substitution for the step A40 in the flow chart shown in FIG. 10. Further, since steps same as those in FIG. 10 indicate same or substantially same portions, detailed description thereof is omitted.

In particular, a personal identification code is transmitted from the IC card apparatus 1a with an authentication function in response to a first request for a personal identification code from the IC reader (step A41), and thereafter, also in response to second and third requests for a personal identification code, the user can transmit the personal identification code similarly without performing fingerprint authentication (steps A42 and A43). Only if the fingerprint authentication is performed only once after the IC card apparatus 1a with an authentication function is opened, then the user can use the IC card apparatus 1a with an authentication function for a plurality of applications, and therefore the availability is high.

In this manner, with the IC card apparatus 1a with an authentication function according to the first embodiment of the present invention, since the fingerprint authentication function is provided for the IC card (card section 3a), that the user (object person of authentication) is an owner of the IC card apparatus 1a with an authentication function can be authenticated based on biometrics information (fingerprint information). Consequently, authentication strength of personal authentication can be enhanced and "impersonation" by any other than the user can be prevented, and illegal use of the IC card by a person having no fair authority can be prevented to raise the security strength.

Further, since the IC card apparatus 1a with an authentication function includes the card section 3a having a shape (card shape) same or substantially same as a conventional IC card and including the communication terminal 31 whose size and communication standard comply with the standard regarding an existing IC card and the main body section 2a including the fingerprint sensor 41, biometrics information can be inputted using the main body section 2a while communication with the outside can be performed using the card section 3a. Therefore, the availability is high.

In particular, according to the card section 3a, an existing IC card reader or IC card reader/writer can be used to output secret information stored in the secret information storage section 12 to the IC card reader or IC card reader/writer through the secret information outputting section 13, or to write the secret information into a memory not shown or the like using the IC card reader/writer. Therefore, an existing IC card reader/writer can be used as it as to raise the security strength, which is economic.

Further, when it is detected by the folding detection section 18 that the card section 3a and the main body section 2a are folded (that is, the communication terminal 31 is in an unused state), an unused state of the card section 3a is detected and the flag (result of authentication) retained in the RAM (authentication result retention section 8) is deleted. Consequently, the unused state of the card section 3a can be recognized easily and with certainty with a simple configuration. Further, also in a case wherein, for example, the IC card apparatus 1a with an authentication function is lost in a state wherein it is folded or the like, even if a third party acquires the IC card apparatus 1a with an authentication function, the third party cannot use the IC card apparatus 1a with an authentication function. Consequently, the security strength can be enhanced.

Further, since an end portion of the card section 3a having an IC card shape and the main body section 2a having the fingerprint authentication function are connected to each other by the hinge 17, the card section 3a can be attached for folding motion to the main body section 2a, and the IC card apparatus 1a with an authentication function in an unused state can be configured in a small size. Therefore, the user can easily carry the IC card apparatus 1a with an authentication function, and the availability is enhanced. Further, by such a configuration as described above, if the folding detection section 18 is used, then also it can be easily detected that the main body section 2a and the card section 3a are folded.

Further, by outputting a personal identification code to the outside of the IC card apparatus 1a with an authentication function through the communication terminal 31 which is a contact type terminal, the personal identification code can be outputted with certainty.

(B) Description of the Second Embodiment

Figure 12:
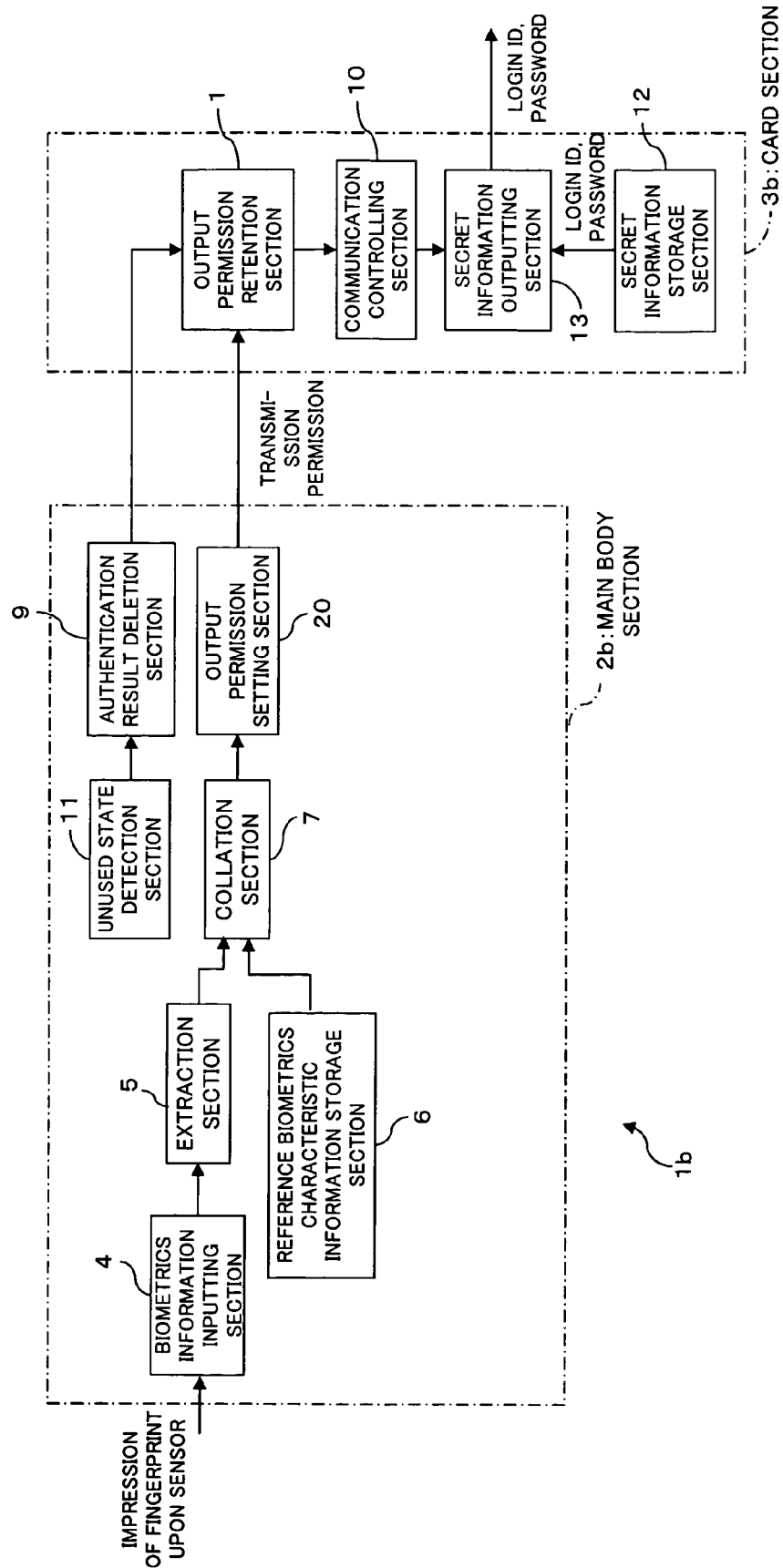
FIG. 12 is a block diagram showing a functional configuration of an IC card apparatus (electronic storage apparatus) having an authentication function as a second embodiment of the present invention.
Figure 13:
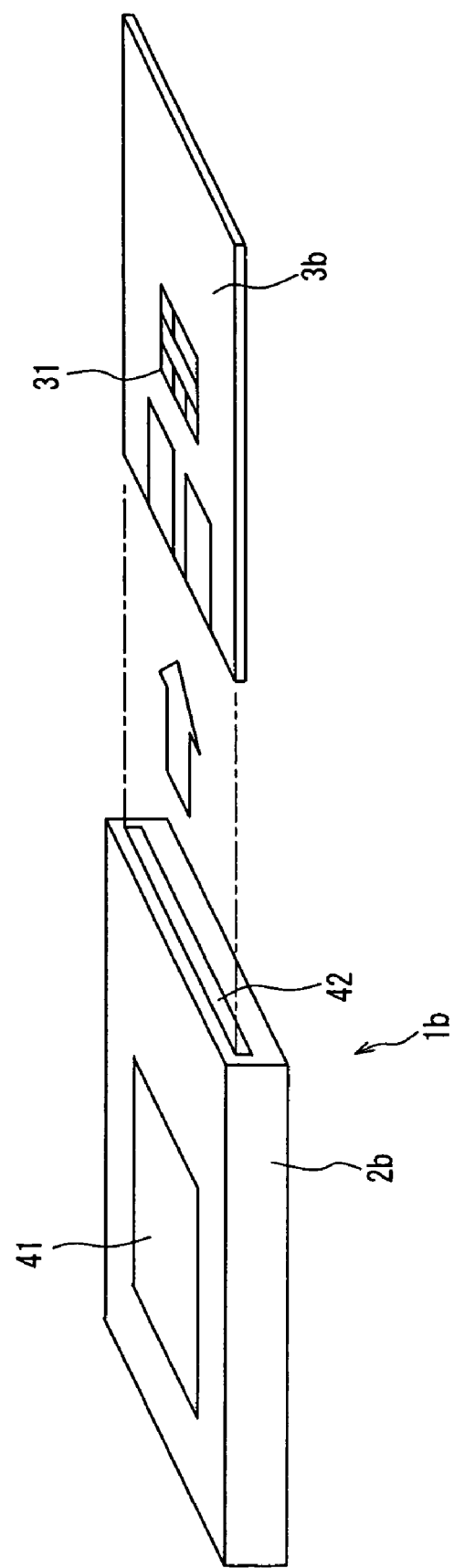
FIG. 13 is a perspective view schematically showing an appearance of the IC card apparatus with an authentication function as the second embodiment of the present invention.

FIG. 12 is a block diagram showing a functional configuration of an IC card apparatus (electronic storage apparatus) with an authentication function as a second embodiment of the present invention. FIG. 13 is a perspective view schematically showing an appearance of the IC card apparatus with an authentication function.

Similarly to the IC card apparatus 1a with an authentication function according to the first embodiment, also the IC card apparatus 1b with an authentication function according to the second embodiment is an IC card (card type storage medium) having an authentication function for authenticating, using biometrics information of an object person of authentication, that the object person of authentication is an owner of the IC card apparatus 1b with an authentication function. If it is authenticated that the object person of authentication is the owner of the IC card apparatus 1b with an authentication function, then the IC card apparatus 1b with an authentication function can output secret information (login ID (Identification) and/or password) stored in a RAM (secret information storage section 12) thereof using an IC card reader (not shown).

As shown in FIG. 12, in the IC card apparatus 1b with an authentication function according to the second embodiment, a card section 3b includes a communication controlling section 10 while a main body section 2b includes an output permission setting section 20, and an output permission retention section 19 is provided in the card section 3b in substitution for the authentication result retention section 8. Regarding a configuration other than the configuration just described, the IC card apparatus 1b with an authentication function has a functional configuration similar to that of the IC card apparatus 1a with an authentication function according to the first embodiment. It is to be noted that, in FIG. 12, like reference characters referred to hereinabove denote same or substantially same elements, and description thereof is omitted herein.

The output permission retention section 19 retains output permission representing that outputting of secret information stored in the secret information storage section 12 is permitted, and is implemented, for example, by an IC memory. In particular, the output permission retention section 19 is implemented the output permission setting section 20 hereinafter described which sets a flag indicating output permission in an IC memory of the card section 3b.

In the IC card apparatus 1b with an authentication function, if it is authenticated as a result of collation by the collation section 7 that the collation biometrics characteristic information is that of an owner, then the result of the authentication is set as output permission to the output permission retention section 19 by the output permission setting section 20. In particular, in the IC card apparatus 1b with an authentication function according to the second embodiment, the output permission retention section 19 has a function similar to that of the authentication result retention section in the first embodiment.

Further, in the second embodiment, where the outputting permission is retained in the output permission retention section 19, the communication section 10 controls the secret information outputting section 13 to output secret information stored in the secret information storage section 12.

In the IC card apparatus 1b with an authentication function, the function as the communication controlling section 10 is implemented by a CPU provided in an IC module (not shown) of the IC card (card section 3b), and the functions as the output permission retention section 19 and the secret information storage section 12 are implemented similarly by the memory (IC memory) provided in the IC module of the IC card. Further, the function as the secret information outputting section 13 can be implemented by the communication terminal 31 or the communication antenna of the IC card.

In particular, the card section 3b includes an IC memory (secret information storage section 12) for storing secret information of an owner, an IC memory (output permission retention section 19) capable of retaining output permission for permitting outputting of secret information, a connection terminal 31 (secret information outputting section 13) capable of outputting the secret information stored in the IC memory (secret information storage section 12) to the outside therethrough, and an IC module (communication controlling section 10) for causing, where the output permission is retained in the IC memory (output permission retention section 19), the connection terminal 31 (secret information outputting section 13) to output the secret information stored in the IC memory (secret information storage section 12).

Where it is recognized as a result of collation by the collation section 7 that collation biometrics characteristic information is that of an owner, the output permission setting section 20 causes the output permission retention section 19 of the card section 3b to retain the output permission (result of authentication) as a flag, and has a function as an IC card writer for writing various information into an IC card.

In the main body section 2b, the functions as the biometrics information inputting section 4, extraction section 5, collation section 7, authentication result deletion section 9, unused state detection section 11 and output permission setting section 20 can be implemented by the CPU, and the function as the reference biometrics characteristic information storage section 6 can be implemented by a ROM or a RAM.

The IC card apparatus 1b with an authentication function according to the second embodiment is configured such that the card section 3 can be inserted into the main body section 2 as shown in FIG. 13, and consequently, the card section 3 can be removably loaded into the main body section 2. In particular, a card slot 42 into which the card section 3b can be inserted is formed in the main body section 2b such that the card section 3b can be inserted (fitted) into the card slot 42. Consequently, the card slot 42 functions as a card type storage medium attaching section to which the card section (card type storage medium) 3b is removably attached.

It is to be noted that preferably such a configuration as additional provision of a lid not shown, rather tight fitting of the card section 3 or the like is applied to the card slot 42 so that the card section 3b does not come out even if the card section 3b is merely directed downwardly in a state wherein the card section 3b is inserted in the card slot 42.

Further, a contact section (not show) projecting so as to contact with the communication section 31 of the inserted card section 3b is formed at a position in the inside of the card slot 42 opposing to the communication terminal 31 of the card section 3b. Thus, if the card section 3b is inserted into the card slot 42, then the contact section is brought into contact with the communication terminal 31 of the card section 3b, and as a result, various information can be communicated with the IC chip, IC memory (authentication result information retention section 8 or secret information storage section 12) or the like provided in the card section 3b.

In particular, the output permission setting section 20 can set output permission to the IC memory of the card section 3b through the contact section and the communication terminal 31.

It is to be noted that, in the second embodiment, the shape (card shape) which is same as or substantially same as that of a conventional IC card can be applied as it is to the card section 3*b*, and also the contact section of the card slot 42 is configured based on the standard for such a conventional IC card as just described.

Further, also regarding the communication standard, the card section 3*b* satisfies the standard for an existing IC card, and has a communication function similar to that of a conventional IC card. Therefore, it is possible to use an existing IC card reader or IC card reader/writer to output the secret information stored in the secret information storage section 12 to the IC card reader or IC card reader/writer through the secret information outputting section 13 and write the secret information into a memory not shown or the like using the IC card reader/writer.

Further, various information can be transmitted and received also between the card section 3*b* and the main body section 2*b* based on the communication standard (protocol) for such an existing IC card reader/writer as described above.

Further, in the main body section 2*b*, the CPU detects that the card section 3*b* is inserted into the card slot 42 or that the card section 3*b* is removed from the card slot 42.

Then, the unused state detection section 11 detects that the card section 3*b* is in a unused state by detecting that, after it is recognized by the collation section 7 that the collation biometrics characteristic information is that of the owner, the card section 3*b* is removed from the main body section 2*b* once and then attached again to the main body section 2*b*.

Further, the IC card apparatus 1*b* with an authentication function includes a power supply switch not shown. If the user uses the power supply switch to switch on the power supply, then the power is supplied to the fingerprint sensor 41, the CPU and so forth and the IC card apparatus 1*b* with an authentication function is placed into a usable state.

In the IC card apparatus 1*b* with an authentication function according to the second embodiment of the present invention having such a configuration as described above, if the user switches on the power supply switch of the IC card apparatus 1*b* with an authentication function in a state wherein the card section 3*b* is inserted in the card slot 42, then the power is supplied to the fingerprint sensor 41, the CPU and so forth provided in the main body section 2*b*, and it becomes possible to perform authentication of a fingerprint.

Similarly as in the IC card apparatus 1*a* with an authentication function according to the first embodiment, if the user touches at a finger thereof with the fingerprint sensor 41 to perform fingerprint authentication and it is authenticated that the inputted fingerprint is that of the owner of the IC card apparatus 1*b* with an authentication function, then a flag indicating that the inputted fingerprint is that of the owner of the IC card apparatus 1*b* with an authentication function is set. Thereafter, a notification that the fingerprint of the user is authenticated successfully is issued to the user.

Then, the user would unload the card section 3*b* from the card slot 42 of the main body section 2*b* and insert the card section 3*b* into the IC card reader. In the card section 3*b*, the IC module (communication controlling section 10) outputs a personal identification code stored in the IC memory (secret information storage section 12) in response to a request from the IC card reader.

After the IC card apparatus 1*b* with an authentication function is used, the user places the used card section 3*b* into the card slot 42. The CPU (unused state detection section 11) of the main body section 2*b* detects that the card section 3*b* is inserted in the card slot 42 thereby to detect that the card section 3*b* (communication terminal 31) is placed into a unused state. The CPU (authentication result deletion section 9) deletes the flag of output permission (result of authentication) retained in the IC memory (output permission retention section 19).

It is to be noted that, also in the IC card apparatus 1*b* with an authentication function according the second embodiment, the flag of output permission (result of authentication) retained in the output permission retention section 19 is not deleted until after it is detected by the unused state detection section 11 that the card section 3*b* is inserted in the card slot 42. Therefore, a plurality of processes can be performed in response to a request from the IC card reader within a period after the execution of fingerprint authentication till the insertion of the card section 3*b* into the card slot 42.

In this manner, also with the IC card apparatus 1*b* with an authentication function according to the second embodiment of the present invention, since the fingerprint authentication function is provided for the IC card (card section 3*b*), that the user (object person of authentication) is an owner of the IC card apparatus 1*b* with an authentication function can be authenticated based on biometrics information (fingerprint information). Consequently, "impersonation" by any other than the user can be prevented, and illegal use of the IC card by a person having no fair authority can be prevented to raise the security strength.

Further, since the card section 3*b* having an IC card shape is attached such that it is inserted into the main body section 2*b* having a shape substantially same as that of the card section 3*b*, the size of the IC card apparatus 1*b* with an authentication function in an unused state can be configured in a small size, and consequently, the user can carry the IC card apparatus 1*b* with an authentication function readily and the availability is enhanced.

Furthermore, since an existing IC card can be used as the card section 3*b*, it is possible to use an existing IC card reader/writer as it is to raise the security strength of the same, which is economical and superior in availability. Further, also the structure of the main body section 2*b* can be implemented at a comparatively low cost, and the IC card apparatus 1*b* with an authentication function is economical also in this regard.

Further, since the unused state detection section 11 detects that the card section 3*b* is in a unused state by detecting that, after it is recognized by the collation section 7 that collation biometrics characteristic information is that of the owner, the card section 3*b* is removed from the main body section 2*b* once and then attached again to the main body section 2*b*, an unused state of the card section 3*b* can be recognized readily and with certainty with a simple configuration.

Furthermore, since the card section 3*b* is configured for insertion into the main body section 2*b*, also the IC card apparatus 1*b* with an authentication function can be configured simply.

(C) Others

The present invention is not limited to the embodiments described above but can be carried out in various modified forms without departing from the scope of the present invention.

For example, while, in the second embodiment described above, the card section 3*b* is removably loaded into the main body section 2*b* by inserting the card section 3*b* into the card slot 42 formed in the main body section 2*b*, the configuration for the removable loading is not limited to this.

Figure 14:
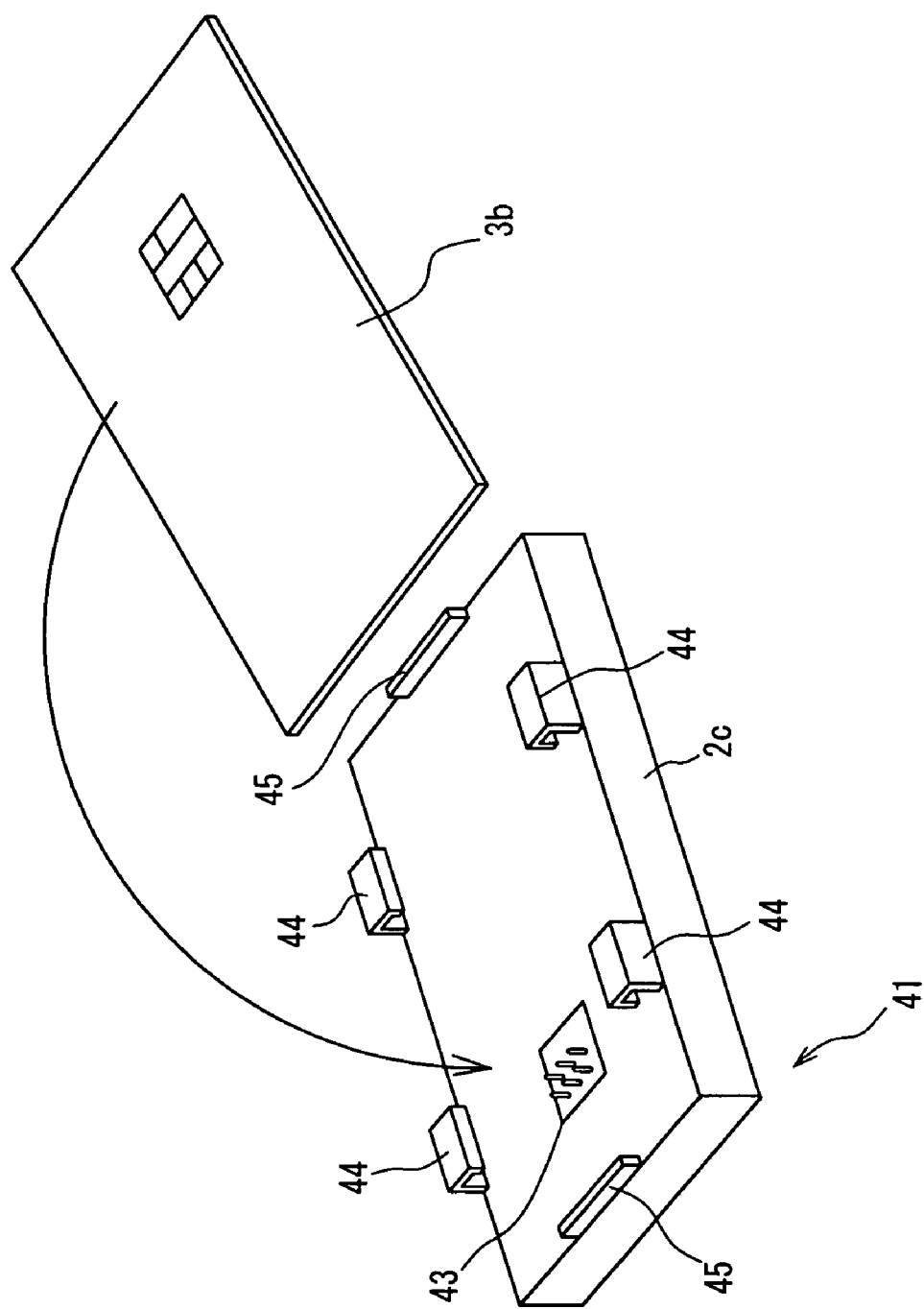
FIG. 14 is a perspective view schematically showing a configuration of an IC card apparatus (authentication apparatus) with an authentication function as a modification of the present invention.

FIG. 14 is a perspective view schematically showing a configuration of an IC card apparatus 1*c* (authentication apparatus) with an authentication function as another modification of the present invention. The IC card apparatus 1*c* with an authentication function shown in FIG. 14 includes a main body section 2*c* and a card section 3*b*, and the card section 3b is attached to a face of the main body section 2c on the opposite side to a face on which a fingerprint sensor 41 is formed. It is to be noted that, in FIG. 14, like reference characters referred to hereinabove denote same or substantially same elements, and description thereof is omitted herein.

In the main body section 2c, a contact section 43 is formed such that it projects until it contacts with the communication terminal 31 of the card section 3b. If the card section 3b is inserted into the card slot 42, then the contact section 43 is brought into contact with the communication terminal 31 of the card section 3b so that various information can be communicated with an IC chip, a memory (authentication result retention section 8 or secret information storage section 12) or the like provided in the card section 3b.

Further, on peripheral portions of a face of the main body section 2c on which the contact section 43 is formed, pawl portions 44 and a holding portion 45 for attaching the card section 3b to the face of the main body section 2c are formed. The pawl portions 44 are provided on longitudinal sides of the face of the main body section 2c on which the contact section 43 is formed and are made of a resilient material such as, for example, a plastic material. The holding portion 45 is a projection in the form of a plate provided on a lateral side on the same face of the main body section 2c and is provided to fix the card section 3b so that the card section 3b may not move in the longitudinal direction of the face of the main body section 2c on which the contact section 43 is formed.

In particular, in the IC card apparatus 1c with an authentication function having such a configuration as described above, the pawl portions 44 and the holding portion 45 function as a card type storage medium attaching section by which the card section (card type storage medium) 3b is removably attached.

Also in the IC card apparatus 1c with an authentication function having such a configuration as described above, operation and effects similar to those of the IC card apparatus 1b with an authentication function of the second embodiment can be achieved. Further, since the card section 3b having an IC card shape is attached in an overlapping relationship to the main body section 2c having a shape substantially same shape as that of the card section 3b, the size of the IC card apparatus 1c with an authentication function in an unused state can be configured small, and consequently, it is easy for the user to carry the IC card apparatus 1c with an authentication function and the availability is enhanced.

Further, the configuration of the card type storage medium attaching section is not limited to those described above, but any technique such as, for example, a magnet, a bonding agent or a surface fastener may be used to attach the card section to the main body section and the card type storage medium attaching section can be carried out in various modified forms without departing from the scope of the present invention.

Furthermore, while, in the embodiments described above, the card sections 3a and 3b include the communication terminal 31 in the form of a contact type terminal and communicate with an IC card reader, an IC card reader/writer or the main body section 2b or 2c through the communication terminal 31, the method of communication is not limited to this, but the card section may include a contactless type communication function such as, for example, a contactless interface antenna in the form of a coil or the like such that it communicates with an external apparatus such as an IC card reader or an IC card reader/writer using the contactless communication function or communicates with the main body section 2b or 2c. Consequently, the card section can communicate readily with an IC card reader, an IC card reader/writer, the main body section 2b or 2c or the like.

For example, the IC card apparatus 1a with an authentication function of the first embodiment may be modified such that it includes a contactless type communication function in place of the communication terminal 31 and, if a contactless IC card reader is tapped, after the IC card apparatus 1a with an authentication function is opened and fingerprint authentication is performed, with the card section in a state wherein the IC card apparatus 1a with an authentication function is open, then a personal identification code is transmitted from the card section to the contactless IC card reader. Also, it is possible to use the energy of the tapping to close the IC card apparatus 1a with an authentication function. In this manner, the IC card apparatus 1a with an authentication function can be used in a high degree of availability.

Further, in the first embodiment described above, the biometrics information inputting section 4, extraction section 5, reference biometrics characteristic information storage section 6, collation section 7, authentication result retention section 8, authentication result deletion section 9, communication controlling section 10 and unused state detection section 11 are provided on the main body section 2, and the secret information storage section 12 and secret information outputting section 13 are provided on the card section 3. However, the arrangement of the components is not limited to this. In particular, the extraction section 5, reference biometrics characteristic information storage section 6, collation section 7, authentication result retention section 8, authentication result deletion section 9, communication controlling section 10, unused state detection section 11 and secret information storage section 12 may be provided on any of the main body section and the card section. Further, the reference biometrics characteristic information storage section 6 may be provided in any of a computer system and so forth connected for communication to the IC card apparatus with an authentication function.

Furthermore, while, in the embodiments described above, a fingerprint is used as biometrics information, the biometrics information is not limited to this, but any other biometrics information such as, for example, a palm print, a finger shape, a palm shape, voice, a retina, an iris, an image of the face, a dynamic signature, a blood vessel pattern or a key stroke may be used.

Further, the structure between the main body section and the card section may be configured such that the card section 3a and the main body section 2a are connected for folding motion to each other through the hinge 17 as in the IC card apparatus 1a with an authentication function of the first embodiment and the card section 3a is removably loaded into the IC card apparatus 1a with an authentication function.

Furthermore, the configuration of the lock mechanism 15 in the IC card apparatus 1a with an authentication function of the first embodiment is not limited to that of the embodiment described above, and for example, a magnet or the like may be used to lock the card section 3a and the main body section 2a in a developed state. In this manner, the configuration can be carried out in various modified forms without departing from the scope of the present invention. As such a configuration of the lock mechanism 15 as described above, various techniques used popularly in portable telephone sets of the folding type or portable telephone sets of the flap type maybe applied.

Further, in the IC card apparatus 1a with an authentication function, the authentication result deletion section 9 may delete a result of authentication retained in the authentication result retention section 8 immediately after the secret information outputting section 13 outputs secret information. In this instance, even if the user loses the IC card apparatus 1a with an authentication function immediately after use of the same, the result of authentication is deleted. Consequently, the IC card apparatus 1a with an authentication function is not used at all by a person who acquires this, and therefore, the security strength of the IC card apparatus 1a with an authentication function can be raised.

Furthermore, the IC card apparatus 1b or 1c with an authentication function described above may be modified such that the authentication result deletion section 9 is provided in the card section 3b such that, immediately after the secret information outputting section 13 outputs secret information, the authentication result deletion section 9 deletes the output permission retained in the output permission retention section 19. In this instance, even if the card section 3b of the IC card apparatus 1b or 1c with an authentication function is lost before it is returned to the main body section 2b or 2c, since the output permission is deleted, the card section 3b is not used at all by a person who acquires the card section 3b and the security strength can be enhanced.

It is to be noted that, where the embodiments described above are disclosed, they can be produced by those skilled in the art.

INDUSTRIAL APPLICABILITY

As described above, the electronic storage apparatus, authentication apparatus and authentically method of the present invention are useful to authenticate that an object person of authentication is an owner of a card type storage medium, and are particularly suitable for an IC card in which secret information of an owner thereof is stored.

The invention claimed is:

1. An electronic storage apparatus, comprising:
a secret information storage section for storing secret information regarding an owner;
a biometrics information inputting section for inputting biometrics information of an object person of authentication;
an extraction section for extracting collation biometrics characteristic information from the biometrics information inputted from said biometrics information inputting section;
a collation section for comparing and collating the collation biometrics characteristic information extracted by said extraction section and reference biometrics characteristic information with each other;
an authentication result retention section for retaining, where it is recognized from a result of the collation by said collation section that the collation biometrics characteristic information is that of the owner, the result of authentication;
a secret information outputting section capable of outputting the secret information stored in said secret information storage section to the outside;
a communication controlling section for causing, where the result of authentication retained by said authentication result retention section indicates that the collation biometrics characteristic information is that of the owner, said secret information outputting section to output the secret information stored in said secret information storage section;
an unused state detection section capable of detecting that said secret information outputting section is in an unused state; and
an authentication result deletion section for deleting, when said unused state detection section detect that said secret information outputting section is in an unused state, the result of authentication retained by said authentication result retention section.

2. The electronic storage apparatus as set forth in claim 1, wherein said secret information outputting section includes a contact type terminal and can output the secret information to the outside of said electronic storage apparatus through said contact type terminal.

3. The electronic storage apparatus as set forth in claim 1, wherein said secret information outputting section includes a non-contact type communication function, and can output the secret information to the outside of said electronic storage apparatus by means of said non-contact type communication function.

4. The electronic storage apparatus as set forth in claim 1, wherein at least said secret information outputting section is provided on a card section having a shape of a card, and at least said biometrics information inputting section is provided in a main body section connected for communication to said card section.

5. The electronic storage apparatus as set forth in claim 4, wherein one end portion of said card section and said main body section are connected to each other by a hinge such that said card section can be attached for folding with respect to said main body section, and
said unused state detection section detects that said card section is in an unused state by detecting a state wherein said card section is folded.

6. The electronic storage apparatus as set forth in claim 4, wherein said card section is removably attached to said main body section, and
said unused state detection section detects that said card section is in an unused state by detecting that, after it is detected by said collation section that the collation biometrics characteristic information is that of the owner, said card section is removed from said main body section once and then attached to said main body section again.

7. The electronic storage apparatus as set forth in claim 6, wherein said card section is configured for insertion into said main body section.

8. An authentication apparatus, on which a card type storage medium including a secret information storage section for storing secret information of an owner, an output authorization retention section capable of retaining an output authorization for authorizing outputting of the secret information, a secret information outputting section capable of outputting the secret information stored in said secret information storage section to the outside, and a communication controlling section for causing, where the output authorization is retained in said output authorization retention section, said secret information outputting section to output the secret information stored in said secret information storage section can be mounted, for authenticating that an object person of authentication is the owner of said card type storage medium, comprising:
a card type storage medium attaching section capable of removably attaching said card type storage medium thereto;
a biometric information inputting section for inputting biometrics information of the object person of authentication;

an extraction section for extracting collation biometrics characteristic information from the biometrics information inputted through said biometrics information inputting section;

a collation section for comparing and collating the collation biometrics characteristic information extracted by said extraction section and reference biometrics characteristic information;

an output authorization setting section for causing, where it is recognized from a result of the collation by said collation section that the collation biometrics characteristic information is that of the owner, said output permission retention section of said card type storage medium to retain the output authorization;

an unused state detection section capable of detecting that said card type storage medium is in an unused state; and an authentication result deletion section for deleting, when said unused state detection section detects that said card type storage medium is in an unused state, the output retained by said output authorization retention section.

9. The authentication apparatus as set forth in claim 8, wherein said unused state detection section detects that said card type storage medium is in an unused state by detecting that, after it is recognized by said collation section that the collation biometrics characteristic information is that of the owner, said card type storage medium is removed from said card type storage medium attaching section once and then attached to said card type storage medium attaching section again.

10. The authentication apparatus as set forth in claim 8, wherein said card type storage medium is configured for insertion into said card type storage medium attaching section.

11. An authentication method for authenticating that an object person of authentication is an owner of a card type storage medium in which secret information is stored, comprising:

a biometrics information inputting step of inputting biometrics information of the object person of authentication;

an extraction step of extracting collation biometrics characteristic information from the biometrics information inputted at the biometrics information inputting step;

a collation step of comparing and collating the collation biometrics characteristic information extracted at the extraction step and reference biometrics characteristic information;

an authentication result retention step of retaining, where it is recognized from a result of the collation at the collation step that the collation biometrics characteristic information is that of the owner, the result of the authentication;

a secret information outputting step capable of outputting, where the result of the authentication retained at the authentication result retention step indicates that the collation biometrics characteristic information is that of the owner, the secret information to the outside;

an unused state detection step capable of detecting that the card type storage medium is in an unused state; and an authentication result deletion step of deleting, where it is detected at the unused state detection step that the card type storage medium is in an unused state, the result of the authentication retained at the authentication result retention step.

* * * * *

UNITED STATES PATENT AND TRADEMARK OFFICE
CERTIFICATE OF CORRECTION

PATENT NO. : 7,404,081 B2
APPLICATION NO. : 11/036978
DATED : July 22, 2008
INVENTOR(S) : Kimitaka Murashita It is certified that error appears in the above-identified patent and that said Letters Patent is hereby corrected as shown below:

Column 22, Line 62, change "biometric" to --biometrics--.

Signed and Sealed this

Tenth Day of March, 2009

JOHN DOLL
*Acting Director of the United States Patent and Trademark Office*